United States Patent [19]

Ezis et al.

[11] Patent Number: 4,554,117
[45] Date of Patent: Nov. 19, 1985

[54] METHOD OF FORMING DENSE CERAMIC BODIES

[75] Inventors: Andre Ezis, Grosse Ile; Warren B. Copple, Dearborn Heights, both of Mich.

[73] Assignee: Ford Motor Company, Dearborn, Mich.

[21] Appl. No.: 444,901

[22] Filed: Sep. 30, 1982

[51] Int. Cl.⁴ .............................................. B28B 11/00
[52] U.S. Cl. ...................................... 264/67; 264/118; 264/325; 264/332
[58] Field of Search .................. 264/67, 325, 332, 65, 264/118

[56] References Cited

U.S. PATENT DOCUMENTS

| 3,007,222 | 11/1961 | Ragan | 264/256 |
|---|---|---|---|
| 3,538,571 | 11/1970 | Callahan et al. | 264/67 |
| 3,713,787 | 1/1973 | Kuniyasu | 264/332 |
| 3,954,930 | 5/1976 | Vasilos | 264/332 |
| 4,264,548 | 4/1981 | Ezis | 264/332 |
| 4,264,550 | 4/1981 | Ezis | 264/332 |
| 4,323,325 | 4/1982 | Samonta | 264/332 |

FOREIGN PATENT DOCUMENTS 1405171  1/1973  United Kingdom ............... 264/325

Primary Examiner—Donald Czaja
Assistant Examiner—Patrick Dailey
Attorney, Agent, or Firm—Joseph W. Malleck; Roger L. May

[57] ABSTRACT

A method is disclosed for simultaneously and uniformly densifying a plurality of semidense ceramic powder bodies. The bodies are hinged together with a uniform space therebetween to form a cluster. The spaces in each cluster are filled with an isostatic pressure medium and then the clusters are stacked in a predetermined alignment along a pressing axis and hot pressed to substantially full density. The bodies are then ruptured from said clusters so as to be in a condition for use as a tool.

17 Claims, 4 Drawing Figures

FIG. I

METHOD OF FORMING DENSE CERAMIC BODIES

BACKGROUND OF THE INVENTION AND PRIOR ART STATEMENT

Recently, modified silicon nitride ceramics have been found useful as cutting tools. For such use, the ceramic can be prepared by hot pressing to full density either (a) a loose powder mixture of silicon nitride and powder additives (see U.S. Pat. Nos. 4,264,548; 4,264,550; and 4,323,325), or (b) a semidense billet of a previously heat treated powder preform having crystallized secondary phases (see copending U.S. application Ser. No. 444,251 now abandoned). Because hot pressing takes place under an unusually reactive environment, along with high pressure (2000–6500 psi) and temperature (1500°–1800° C.), it has been necessary to arrange the pressing die to press only a unitary body of the ceramic in a simple geometrical form such as a cylinder or disc. The resulting disc or cylinder must then be cut or sawed with expensive diamond materials to produce a production type cutting tool of appropriate geometry capable of being used in milling and other industrial machine cutting operations.

Producing accurate tool surfaces in their substantially usable condition, as a direct result of hot pressing, has long been a goal of the prior art. However, due to volume changes, and chemical reactions during hot pressing, the goal has not been attained. Considerable removal of material is shaved or ground off the hot pressed product to define the cutting tool insert accurately.

Thus individualized pressing of one body has been the normal commercial mode of producing silicon nitride ceramics which can be formed into a cutting tool. The prior art has considered the goal of making a plurality of cutting tool bodies, each having a desired rough final configuration as a result of hot pressing, within a single hot pressing sequence. This would be most desirable because the unit cost of each tool would be substantially reduced and much of the diamond cutting or shaping would be eliminated. One attempt by the prior art to achieve such simultaneous pressing of multiple independent bodies is represented in British Pat. No. 1,405,171, wherein a plurality of independent triangular modules of silicon nitride material, along with triangular shaped packing bodies deployed along the periphery of the pressing chamber, were nested within a hot pressing cavity and hot pressed under a single stroke or sequence. The number of bodies in the pressing sequence were laid in a common layer limited to two bodies in such layer. In an alternative suggestion, two layers were employed with two bodies in each layer. Since each body was free to move relative to the other when placed in the hot pressing cavity, and since there was no isostatic pressure transfer medium between the bodies, it was difficult to provide for uniform transfer pressure between the bodies while under the pressing sequence. Thus nonuniform densities resulted within the ultimate pressed bodies.

SUMMARY OF THE INVENTION

The invention is a method of simultaneous and uniformly densifying a plurality of semidense ceramic particulate bodies characterized by less cost and greater reliability. The method involves (a) hinging the bodies together with a predetermined uniform space therebetween to form a cluster of said bodies, (b) filling the spaces between said bodies within said cluster with an isostatic pressure medium, (c) hot pressing one or more of said clusters, arranged in contiguous stacked relation, with sufficient pressure and temperature to densify each of the bodies to at least 96% of full theoretical density, and (d) freeing said bodies from said cluster by rupturing said hinges, leaving each body in a substantially usable condition as a cutting tool.

It is desirable if the hinging is arranged in a common plane to form a planar cluster of bodies; the clusters may then be stacked during hot pressing. The hinging of step (a) is preferably provided by forming a semidense disc of silicon nitride based material, deeply grooving the disc in a pattern along one face to define said bodies and to leave only enough ungrooved material between said bodies to define hinges therebetween. More particularly, the grooving may be carried out to a generally uniform depth whereby the ungrooved material defines a thin membrane along the opposite face of the disc. The semidense disc may be formed by agglomerating or cold compacting powder materials of at least one of either a mixture of silicon powder with fluxes or other additives which is then subjected to a nitriding treatment, or a mixture of silicon nitride powder along with fluxing or other additives. The grooving may also be carried out on thermally strengthened, cold compacted silicon powder prior to nitriding. In any case, the powder mixture is cold pressed into a preform preferably shaped as a round disc having a thickness of about 0.3–0.8 inches and a diameter of 3–12 inches. Optimally, the grooves are patterned in a grid and penetrate to a depth of about 90–95% of the disc. The discs to be grooved may preferably have a density of 85% or less, and the hot pressed bodies preferably have a density of greater than 96% of theoretical (3.1 g/cc or greater).

The hinges are ruptured in the last step by a diamond grinding operation which not only removes the hinge itself, but also a small portion of each body (the hinge and small portions together constituting a membrane). If the bodies are hinged at a mid-location of their sides, rather than at the bottom, diamond grinding of the bottom membrane is not needed and rupture is by manual fracture. Advantageously, the isostatic pressing medium is selected from the group consisting of boron nitride, flake graphite, borosilicate glass, or other powdered metals or glass that provide appropriate viscosity and inertness at the temperature of the hot pressing operation. The clusters may be preferably stacked in contiguous order in numbers of 10 or more in the pressing cavity.

The above method is advantageous because it (a) reduces the cost of the current method of fabricating ceramic cutting tools, (b) eliminates ceramic material transport during the hot pressing step (the transport causing dishing), and (c) provides a quicker and more accurate way of setting up the hot pressing assembly.

DETAILED DESCRIPTION

Figure 1:
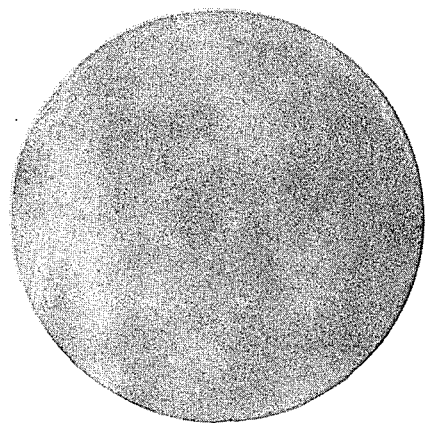
FIGS. 1–4 are photographs respectively of (1) a plan view of a nitrided preformed disc of silicon nitride, (2) a plan view of the nitrided preformed disc after it has been subjected to grooving to define a cluster of bodies, (3) an elevational view of the grooved disc, and (4) a plan view of the hot pressed cluster showing some bodies freed from the cluster by fracturing the interconnecting hinge and thereby defining a usable cutting tool.
Figure 2:
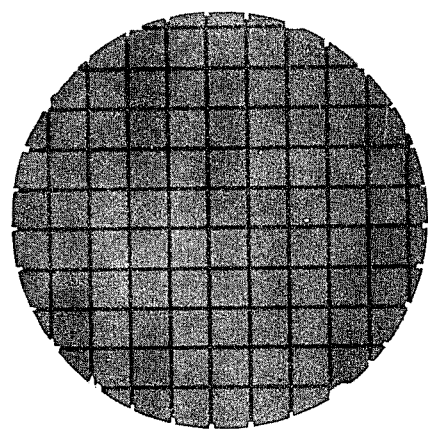
Figure 3:
Figure 4:
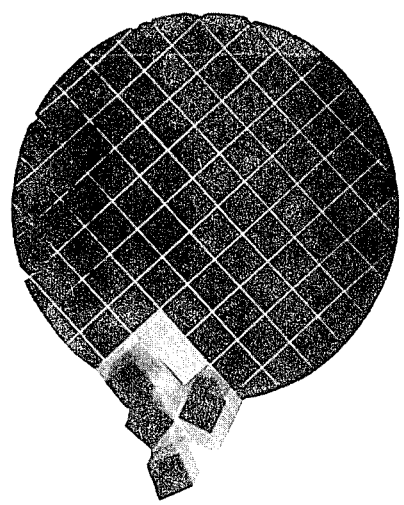

Individualized molding of one body has been the normal mode of fabricating ceramic cutting tools. This invention provides for multiple and simultaneous molding of several ceramic bodies and densification of such bodies within a single hot pressing stroke. The advantages of such a method include: (a) quick and accurate hot pressing setup by the handling of harnessed individual bodies of ceramic material which can be quickly put into place even though comprised of a plurality and complex pattern of bodies, (b) the elimination of material transport during the hot pressing process to eliminate dishing of the ceramic bodies which are to be used as cutting tools, and (c) the dramatic reduction of the expense of cutting and shaping the cutting tool bodies after the hot pressing step. The reduction in expense is a direct result of attempting to diamond cut and shape the fully densified hot pressed bodies which is the traditional technique of the prior art.

A preferred method in accordance with this invention is as follows.

HINGING OF PREFORMED POWDER BODIES

A plurality of powder preforms are integrally connected to form one or more clusters of the preforms, the preforms having a predetermined uniform space therebetween and having a periphery conforming to a cross section of the pressing cavity. This interconnection of the powder preforms is herein termed "hinging."

Preliminary to this step, a mixture of powdered silicon and reactive oxygen carrying powder agents is prepared and milled. Reactive oxygen carrying agents is defined herein to mean powder ingredients that are effective to form protective silicates and/or second phase crystallites, particularly oxynitrides when reacted with silicon under a heated nitrogen atmosphere. The powder agents can be advantageously selected from the group consisting of $Y_2O_3$, $Al_2O_3$, $SiO_2$, $MgO$, $CeO_2$, $ZrO_2$, $HfO_2$, and rare earths. Use of these agents will improve physical characteristics in formation of a second phase crystallite which will be uniformly dispersed and substantially displace the detrimental glassy silicate phase normally formed, except for a controlled and highly limited amount of the glass.

Further description of the amount of ingredients that are useful in this preferred method are set forth in copending U.S. application Ser. No. 444,251, commonly assigned to the assignee of this invention, and the disclosure of which is incorporated herein by reference.

A measured quantity of the milled mixture is loaded into a cold pressing die arrangement and pressed at ambient conditions using a pressure of 1400–1500 psi. The pressed body (hereafter called a billet) is in the form of a circular disc having a diameter of about 6 inches and a thickness of about 0.6 inches. The density of the silicon metal billet at this stage is about 1.4 grams per cubic centimeter, which is approximately 60% of full theoretical for silicon. The density preferably must be less than 73% (1.7 gm/cm$^3$ or less). It may be desirable to argon sinter the billet at 2000° F. for two hours prior to nitriding to give the disc sufficient strength so that it can be grooved prior to nitriding, as one option. However, if the grooving is to take place after nitriding, the following procedure is followed.

The compact is heated in a nitriding atmosphere, without the use of pressure normally associated with hot pressing, to produce a silicon nitride comprising body or billet consisting of $Si_3N_4$, at least one dispersed second phase crystallite (silicon oxynitride), 0.2–1% silicate (by weight of the body), and up to 0.5% by weight of free silicon and $Y_2O_3$. The body will have a size greater than and a density less than the object to be formed from hot pressing. (For further details see the disclosure in copending U.S. application Ser. No. 444,251, previously noted herein.)

Either prior to the nitriding of said disc preform or subsequent to said nitriding, grooves are cut into one face or surface of said preform, preferably in a grid pattern, each groove penetrating to a generally uniform depth of preferably 90–95% of the thickness of the disc, thereby leaving a membrane of ungrooved ceramic material along the opposite side of said disc which results in the definition or formation of a hinge between adjacent ungrooved preformed bodies. The grooves are typically 0.035 inches in width and can be generated by the use of a diamond grinding wheel or by equivalent means such as ultrasonics, or they may be imprinted as part of a molding or casting operation to define the preform (i.e., slip casting using wax grid).

The formation of grooved billets or discs can be repeated to form a plurality of such discs, each having identical grid patterns. Alternatively, the preform may be formed of silicon nitride powder admixed with said fluxes and other binder additives; the grooving can be applied to such preform before hot pressing.

FILLING WITH ISOSTATIC PRESSURE MEDIUM

The spaces defined by said grooves in the grooved billets or discs are filled with an isostatic pressure medium. The isostatic pressure medium may be selected from the group comprising boron nitride powders, flaked graphite, borosilicate glass, or other metals and glasses that provide sufficient viscosity and inertness at the temperature of hot pressing to be experienced. The isostatic pressure medium is typically formed into a slip by the addition of alcohol. The slip is then cast and set up with scraping of excess material across the top of the billet or disc. Alternately, a portion of the excess material can be retained and used as a parting agent to prevent fusion between plates during hot pressing. The density of the formed isostatic media must be such that it will contract simultaneously with the grooved discs during hot pressing; that is, the isostatic media must not prevent the densification of the subject discs.

STACKING

Each of the discs is then stacked along the line of pressing and all identically positioned with the grooves interfacing within said pressing cavity. To accomplish such interfacing, the discs must alternately face up, the next one down, etc. There is a parting agent between interfacing discs. The parting agent is a thin layer (0.010" or less) of the isostatic media employed in the grooves and is used to prevent fusion during hot pressing. Other parting agents can be graphite foil or Mo foil.

The hot pressing assembly typically comprises a cylinder with one or more movable end plungers effective to apply sufficient pressure during the hot pressing sequence. The assembly receives its heat from a furnace into which the assembly is placed for the prescribed period of time. A pressing fixture having graphite walls is used to carry out hot pressing. The walls and nitrided bodies are both coated with a slurry of boron nitride and dried. The pressing fixture with nitrided bodies therein is placed in the hot pressing furnace. The heating and pressing is carried out preferably in increments, as described in said copending U.S. application previously noted herein. The stacking sequence of the bodies need not be of any special order and need not have rigid separating barriers, such as graphite spacers, between the serrated grooved discs. More than 10 discs may be employed successfully since there is spacing between the grooved bodies which does not allow for material transport.

We claim:

1. A method of simultaneously and uniformly densifying a plurality of semidense ceramic particulate bodies, comprising:
   (a) hinging said bodies together with a uniform space therebetween to form a cluster of said bodies;
   (b) filling the spaces between said bodies within said cluster with an isostatic pressure medium which is viscous and inert at hot pressing conditions;
   (c) hot pressing one or more of said clusters, arranged in contiguous stacked relation, with sufficient pressure and temperature to densify each of said bodies to at least 96% of full theoretical density; and
   (d) freeing said bodies from said cluster by rupturing said hinges, leaving each body in a substantially usable condition as a cutting tool.

2. The method as in claim 1, in which said bodies in step (a) are hinged together along a common plane to form a planar cluster of said bodies.

3. The method as in claim 1, in which in step (a) said hinging is provided by agglomerating a semidense disc of silicon nitride based material, deeply grooving said disc in a pattern along one face to define said bodies and to leave only enough ungrooved material between said bodies which define hinges.

4. The method as in claim 3, in which substantially all said grooving is carried out to a generally uniform depth whereby the ungrooved material defines a thin membrane along the opposite face of said disc.

5. The method as in claim 3, in which said grooving is carried out along a grid pattern to define bodies of substantially identical configuration.

6. The method as in claim 3, in which said disc is formed to have a density of 2.7 g/cc or less and said hot pressing is carried out to provide a density of at least 3.1 g/cc.

7. The method as in claim 1, in which said isostatic pressing medium is selected from the group consisting of boron nitride, flake graphite, borosilicate glass, and powdered metals or glass that provide sufficient viscosity and inertness at the temperature of the hot pressing step.

8. The method as in claim 4, in which step (d) is carried out by uniformly grinding off said membrane.

9. The method as in claim 1, in which said hinging is provided by (a) forming, into a disc, materials of at least one of either a mixture silicon powder and other fluxing or other additives which is then subjected to a nitriding treatment, or a mixture of silicon nitride powder along with fluxing or other additives, (b) cutting a pattern of grooves in said disc with each groove penetrating to a generally uniform depth to leave a membrane of ungrooved material along the opposite side of said disc which cooperates to define one or more hinges between adjacent bodies.

10. The method as in claim 9, in which the grooves are formed in a grid pattern, each groove penetrating to a depth of 90–95% of the thickness of said disc.

11. The method as in claim 1, in which in step (d) said bodies are freed by the use of diamond grinding.

12. The method as in claim 1, in which said hinges are defined at a mid-section of a side of each body and said hinges being manually ruptured.

13. The method as in claim 9, in which said disc is round, having a thickness of 0.3–0.8 inches and a diameter of 3–12 inches.

14. A method of forming a plurality of hot pressed ceramic objects in a single pressing cavity, comprising:
   (a) compacting ceramic powders into a preformed disc having a periphery conforming to a cross section of said cavity and a density no greater than 85% of full theoretical;
   (b) grooving said plate from opposite, opposed surfaces to define a grid pattern of grooves, the spacing between said grooves being sized to define useful cutting tools between said grooves, each groove penetrating said disc to a depth less than half to thereby define a hinge from the ungrooved portions of the disc and unitizing bodies into a cluster for handling;
   (c) filling the grooves with an isostatic pressing medium;
   (d) placing the cluster of bodies into the pressing cavity and hot pressing said bodies to substantially full density; and
   (e) fracturing said hinges to free the ungrooved bodies for use as cutting tools.

15. The method as in claim 14, in which the ceramic powders used in step (a) are comprised of silicon nitride.

16. The method as in claim 14, in which in step (d) 10 or more of the clusters are placed in contiguous stacked order within the pressing cavity.

17. The method as in claim 14, in which alternating pairs of adjacent clusters have the grooves interfacing.

* * * * *